(12) United States Patent
Sato et al.

(10) Patent No.: US 8,374,900 B2
(45) Date of Patent: *Feb. 12, 2013

(54) DETERMINING COMPOSITE SERVICE RELIABILITY

(75) Inventors: Naoto Sato, Kanagawa-ken (JP); Hiroaki Nakamura, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/481,929

(22) Filed: May 28, 2012

(65) Prior Publication Data

US 2012/0232941 A1 Sep. 13, 2012

Related U.S. Application Data

(63) Continuation of application No. 11/932,662, filed on Oct. 31, 2007, now Pat. No. 8,255,251.

(51) Int. Cl.
*G06Q 10/00* (2006.01)
(52) U.S. Cl. ...................................... 705/7.11; 705/7.28
(58) Field of Classification Search .................. 705/7.11, 705/7.28
See application file for complete search history.

(56) References Cited

U.S. PATENT DOCUMENTS

2006/0129367 A1* 6/2006 Mishra et al. .................... 703/13

OTHER PUBLICATIONS

Kishor S. Trivedi, et al. "Modeling High Availability Systems" in 12th Pacific Rim International Symposium on Dependable Computing (PRDC'06) IEEE 2006.*

Kishor S. Trivedi, et al. "Modeling High Availability Systems" in 12th Pacific Rim International Symposium on Dependable Computing (PRDC'06) IEEE 2006.*
Sato, et al. "Accurate and effcient stochastic reliability analysis of composite services using their compact Markov reward model representations" in 4th IEEE International Conference on Services Computing, IEEE Computer Society, Salt Lake City, Utah, Jul. 2007.*
Web page for Sato paper obtained from http://liveweb.web.archive.org/http://www.trl.ibm.com/people/nomad/publications_iframe.htm and downloaded May 10, 2011.*
Ma, Yue. "Composite Performance and Availability Analysis in Wireless Communications Systems", dissertation, Department of Computer Science, Duke University 1999.*
Xie, Wei. "Availability and Performance Evaluation of E-Business Systems", dissertation, Department of Electrical and Computer Engineering Duke University 2003.*
Muppala, J., et al. "Markov Dependability Models of Complex Systems: Analysis Techniques", in Reliability and Maintenance of Complex Systems, Ozekici, ed. pp. 442-486, Springer-Verlag, Berlin, 1996.*
A. Zarras et al., "Model-driven dependability analysis of web services," in: Proc. of the International Conference on Distributed Objects and Applications (DOA), Oct. 2004.

(Continued)

*Primary Examiner* — Mark A Fleischer
(74) *Attorney, Agent, or Firm* — Vazken Alexanian

(57) ABSTRACT

The reliability of a composite service having service components is determined, where the composite service can fail only where underlying resources fail. The composite service is represented as a plurality of continuous-time Markov chains (CTMC's). Each CTMC corresponds to a resource. A product of the CTMC's is constructed. The product encompasses composite service states. Steady-state probabilities for the product are determined. Each steady-state probability corresponds to a likelihood that a corresponding state will be a steady state. For each state of the composite service, a reward structure is determined. The reward structure corresponds to a likelihood that the state will successfully use the resources without failure. The reward structure is determined for a given state based on the given state's steady-state probability and based on discrete-time Markov chains (DTMC's) corresponding to the service components. The reliability of the composite service is determined based on the reward structure of each state.

14 Claims, 10 Drawing Sheets

OTHER PUBLICATIONS

G. Ciardo et al., "Automated generation and analysis of Markov Reward Models . . . ," IMA Volumes in Mathematics and its Applications 48, 145-145, year 1993.

K. Goseva-Popstojanova et al., "Failure correlation in software reliability models," Trans. on Reliability, Mar. 2000.

V. Grassi et al., "Reliability prediction for service-oriented computing environments," Internet Computing, 2006.

M. Kaaniche et al., "A user-perceived availability evaluation of a web based travel agency," In the 33rd DSN, year 2003.

J. Muppala et al., "Stochastic reward nets for reliability prediction," Communications in Reliability, Maintainability and Serviceability 1 (2), 9-20, year 1994.

L. Page et al., "A model for system reliability with common-cause failures," Trans. on Reliability, 38(4):406-410, Oct. 1989.

V. Sharma et al., "Reliability and performance of component based software systems with restarts, retries, reboots, and repairs," in 17th ISSRE, year 2006.

L. Tomek et al., "Analyses using stochastic reward nets," Chapter 6, John Wiley & Sons (pub.), year 1994.

K. Trivedi et al., "Markov reward approach to performability and reliability analysis," in 2nd Int'l Workshop on Modeling, Analysis & Simulation of Comp. & Tele. Sys., 1994.

D. Wang et al., "Modeling user-perceived service availability," in Int'l Service Availability Symposium, pp. 107-122, Berlin, Apr. 2005.

W. Wang et al., "Analysis of Conditional MTTF of Fault-Tolerant Systems," Microelectronics & Reliability, 38(3):393-401, 1998.

* cited by examiner

DETERMINING COMPOSITE SERVICE RELIABILITY

RELATED APPLICATIONS

The present patent application is a continuation of the patent application of the same name and having the same inventors, filed on Oct. 31, 2007, and assigned application Ser. No. 11/932,662.

FIELD OF THE INVENTION

The present invention relates generally to composite services that are made up of a number of service components that are effectuated using underlying resources. More particularly, the present invention relates to determining the reliability of such a composite service where the each resource is represented as a continuous-time Markov chain (CTMC) and each service component is represented as a discrete-time Markov chain (DTMC).

BACKGROUND OF THE INVENTION

Service composition has become a common practice in business enterprises. A service is a computerized process that mimics an actual real-world physical or business process. A composite service is such a service that is constructed using a number of service components that are arranged and invoked in a way to perform the desired functionality of the composite service. The service components, and thus the composite service itself, are implemented, or effectuated, using underlying physical resources, such as computing devices like servers, and other types of computing hardware.

Because service composition has become a common practice, reliability of composite, or composed, services has become an issue. Reliability analysis has been studied for decades for safety-critical systems, but composite services pose a new challenge. For most safe-critical systems, the hardware and software modules are rigidly integrated and remain unchanged during operation. By contrast, service components of a composite service are often updated and replaced, and their mappings to underlying physical system resource, such as servers, are subjected to reconfiguration. Due to this flexibility, carefully constructing a single tailor-made model for a composite service to determine its reliability is not a viable option.

There currently exist two major technologies for reliability analysis of composite services. They are based on (stochastic) state-space models, as well as on combinatorial models of services. State-space models, such as Markov chains and stochastic Petri nets, represent service components and resources as probabilistic state transition systems, of which the states may reflect their reliability. Given the component and resource models, they can be combined into a larger model representing the composite service that accurately captures the impact of particular failures on the reliability of the entire composite service as a whole. However, this state-based approach often incurs high computational complexity due to state-space explosion.

Combinatorial models, by comparison, which include reliability block diagrams (RBD's) and fault trees (FT's), focus on the causal relations (i.e., reliability-related dependencies) between components and resources. By ruling out possible time-dependent changes of reliability, analyses using these models achieve high computational efficiency at the expense of a potential loss of accuracy. As such, current reliability analyses are plagued by a tradeoff between analysis accuracy and computational complexity.

It is noted that modeling system resources, such as servers, as continuous-time Markov chains (CTMC's) is common. By defining normal and failure states along with transition rates between them, several key metrics can be computed, including resource availability and the mean time to failure/repair (MTTF/MTTR). Recently, to take better account of user/software behavior that affects resource usage, several techniques for hierarchical modeling of software systems that integrate models of user/software behavior and underlying resources have been proposed.

Markov reward models (MRM's) have been considered as a unified basis on which to conduct system dependability analysis. For high-level representations of MRM's, stochastic reward nets, based on the Petri net foundation, have been proposed and employed. Correlation between failures has also been addressed, focusing on failure correlation between successive runs of software and formulating these runs based on the Markov renewal process.

Other prior art has focused on the derivation of stochastic models from high-level services definitions. Although it may be useful to construct stochastic models in such an automated manner, the resulting models may nevertheless still suffer from the accuracy-complexity tradeoff that has been discussed. For all of these reasons, as well as other reasons, there is a need for the present invention.

SUMMARY OF THE INVENTION

The present invention relates to determining composite service reliability. A computerized method of one embodiment of the invention determines the reliability of a composite service that has a number of service components. The composite service is capable of failing only where underlying physical resources by which the composite service is effectuated fail. The composite service is represented as a number of continuous-time Markov chains (CTMC's). Each CTMC corresponds to one of the underlying physical resources.

A product of the CTMC's is constructed that encompasses a number of states of the composite service. A number of steady-state probabilities for the product of the CTMC's are determined. Each steady-state probability corresponds to the likelihood that a corresponding state of the composite service will be a steady state of the composite service. For each state of the composite service, a reward structure of the state of the composite service is determined. The reward structure corresponds to the likelihood that the state will successfully use the underlying physical resources without failure.

The reward structure is determined for a given state of the composite service based on the steady-state probability corresponding to the given state and based on a number of discrete-time Markov chains (DTMC's). Each DTMC corresponds to one of the service components of the composite service. The reliability of the composite service is then determined based on the reward structure of each state of the composite service. Finally, the reliability of the composite service as has been determined is output.

In one embodiment of the invention, a method can be implemented as one or more computer programs that are executable using one or more processors of one or more computing devices. The computer programs are stored on a computer-readable medium. The computer-readable medium may a recordable data storage medium.

Embodiments of the invention provide for advantages over the prior art. In particular, composite service reliability is determined such that the computational complexity of the determination is reduced without sacrificing accuracy. That is, embodiments of the invention overcome the accuracy-complexity tradeoff that has been described in the background section.

Embodiments of the invention rely on the following two assumptions. First, service execution typically fails due to resource failures—that is resources are the primary failure sources. Second, each run of a service completes almost instantaneously (in seconds, for instance), as compared to the time between resource failures (in days or weeks, for instance). Based on these two assumptions, service components are modeled as DTMC's representing their control flows in a probabilistic manner, and resources are modeled as CTMC's of which the states reflect their reliability. For example, the "down" state of a resource indicates that it is unreliable.

DTMC states can represent service invocations or resource users. As a result, when the states of the resource CTMC's are specified, the service reliability, defined as the probability that service execution completes successfully, can be defined. By determining the service reliability for the possible resource state combinations and attaching these resultant values to their corresponding states, the component DTMC's are no longer needed. Rather, the service reliability can be determined efficiently by using (enriched) resource CTMC's, which are formally referred to as Markov reward models (MDM's). The resulting reliability analysis is as accurate as the original DTMC and CTMC models can guarantee.

The contribution of embodiments of the invention to the technical art is two fold. First, a new approach to transform a composite service defined by a set of DTMC's and CTMC's into an equivalent and compact MRM form is described herein. A high degree of flexibility is permitted in service composition: service components can invoke other (possibly shared) service components or use (possibly shared) resources. Furthermore, failures at resources can affect service components in different ways. These effects are defined separately so that reliability analysis involving shared resources can be supported effectively. The second contribution is that the MRM's obtained by transformations can be composed to yield another MRM that is equivalent to the MRM obtained after the corresponding service composition. This assists modular reliability analysis of composite services.

Embodiments of the invention thus employ CTMC's to model resources. The service components are modeled as DTMC's, and transition probabilities can reflect user behavior in this way. Embodiments of the invention are based on the MRM foundation, but reduce a composite service modeled by DTMC's and CTMC's to an equivalent and compact MRM. As opposed to focusing on failure correlation between successive runs of software and formulating these runs based on the Markov renewal process, as in some of the prior art, embodiments of the invention deal with correlation between failures that are caused by different system resources.

Still other aspects, advantages, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Service components of a composite service and the underlying physical resources that effectuate the composite service are represented in a unified manner. Each service component may use resources and may also invoke other service components, which may be external sources. Resources abstract a wide range of entities, including servers, storage devices, network channels, and system software on which the service components are running. External services invoked within a service component can also use resources or invoke service components.

Figure 1:
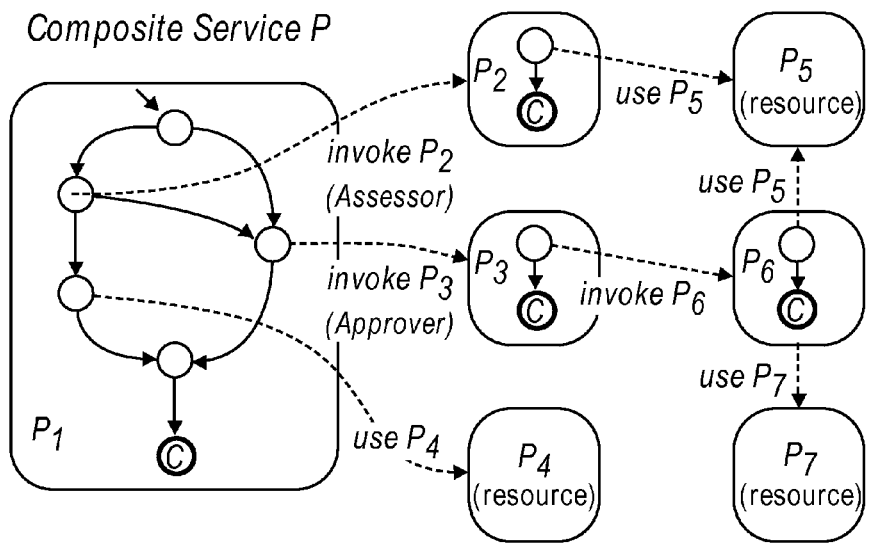
FIG. 1 is a diagram of a graphical view of an example composite service, according to an embodiment of the invention.

Therefore given a composite service P, $\mathcal{R}(P)$ and $\mathcal{S}(P)$, respectively denote the resources and the services that are reached by P directly or indirectly. To capture the compositional nature of services, graph representations of services can be used. FIG. 1 shows a graphical view of an example composite service, according to an embodiment of the invention. The service is denoted by P and defined with seven nodes, $P_1, P_2, \ldots, P_7$ ($\mathcal{S}(P)=\{P_1,P_2,P_3,P_6\}$, $\mathcal{R}(P)=\{P_4,P_5,P_7\}$), and seven edges among them.

The following assumptions regarding the topological structures of composite services are made herein. First, each resource is a self-contained entity. In graphical terms, resources are terminal nodes. Second, there is always a single root node that has no incoming edge. Third, no invocation chain can be cyclic. That is, the graphs are directed acyclic graphs.

With these assumptions, a textual notation can be developed for concise representation of composite services. The following syntax rules define structures of composite services:

$P ::= S_{unit}[P_{par}]$
$P_{par} ::= R | P ||_L P_{par} | P ||_L P_{par}$
where L is a set of labels specking shared resources or services
$S_{unit} ::=$ (Unit) service represented by a DTMC
$R ::=$ Resource represented by a CTMC When a service $P_1$ invokes or uses another service or resource $P_2$, this is represented as $P_1[P_2]$. If $P_3$, in addition to $P_2$, is also invoked or used, this is represented as $P_1[P_2||P_3]$. It is noted that $P_2$ and $P_3$ can be further nested and may share some common services or resources. For example, $P_2$ and $P_6$ in FIG. 1 share $P_5$. Such common nodes are explicitly specified in the notation. The composite service P in FIG. 1 is thus represented as $P_1[(P_2[P_5]||_{P_5} P_3[P_6[P_5||P_7]])||P_4]$.

For stochastic reliability analysis of composite services, resources are modeled as irreducible continuous-time Markov chains (CTMC's) and services are modeled as discrete-time Markov chains (DTMC's). The CTMC for a resource is a pair (S, R) where S is a finite set of states and R: $S \times S \to \mathbb{R}_{\geq 0}$ is the rate matrix. The states in S are distinguished according to the degree of success of their uses. In the simplest case, S consists of the "up" state, in which its use always succeeds, and the "down" state, in which its use always fails.

The DTMC for a service is a pair (S, P) where S is a finite set of states and $P : S \times S \to [0,1]$ is the transition probability matrix. It is assumed that in each state of the DTMC, it may use a resource, invoke a service, or perform internal operations. These intra-state activities are completed instantaneously (i.e., without delay), implying each run of a service completes instantaneously.

Two additional assumptions are imposed. First, resources are the only sources of faults. When a resource does not cause any fault, services that use the resource always succeed. Second, the duration of each resource use by a service can be considered to be zero, and thus the state of a resource remains unchanged while it is in use.

When a composite service P is defined, such as in FIG. 1, its services $\mathcal{S}(P)$ and its resources $\mathcal{R}(P)$ are connected together through service invocations and resource uses. For example, suppose a service $P_i = (S_i, P_i) \in \mathcal{S}(P)$ invokes an external service $P_j$ at $s \in S_i$, another service $P_k$ at s', and so on. $I(P_i)$ denotes the service invocations within $P_i$ (i.e., $I(P_i) = \{(s, P_j), (s', P_k), \ldots\}$). Furthermore, $U(P_i)$ denotes the resource uses within $P_i$ in a similar manner, except that each use of a resource accompanies a reward structure that represents the probability of successful use of the resource. For example, suppose $P_i = (S_i, P_i)$ uses a resource $P_j = (S_j, R_j)$ when $P_i$ stays in $s \in S_i$. Then $U(P_i)$ includes $(s, P_j, \rho_s)$, where $\rho_s : S_j \to [0,1]$ maps $s' \in S_j$ to the probability that the resource use completes successfully.

The reliability of a software system, and thus of a composite service, can be defined as the probability of its successful completion. More specifically, given a DTMC P that represents the control flow of a services, its reliability R(P) is defined as follows.

$$R(P) = Pr[P \text{ reaches its completion state}] \quad (1)$$

Based on this, the reliability of a composite service P at time t is defined as follows.

$$SR(P,t) = R(\Phi(P, \phi(P,t))) \quad (2)$$

Here, $\Phi$ is a newly introduction function that transforms the top-level DTMC of P to another DTMC so that R defined by Equation (1) can be applied.

Formal definitions of $\Phi$ and $\phi$ are now provided. Given a composite service P, it is supposed that its root node is $P_{root}$ (i.e., $P_{root}[P_1||L||P_i||L]$), and $P_{root}(\in S(P))$ is defined as a DTMC $(S_0, P_0) = (\{s_i | 1 \leq i \leq n\}, (p_{ij})_{1 \leq i,j \leq n})$. It is assumed that $\phi(P,t)$ is of the form $\{(s_i, R_i)\}_i$, which gives a mapping between $s_i \in S_0$ and $R_i$, the latter being the reliability of the activity in $s_i (0 \leq R_i \leq 1)$. Then, $\Phi$ extends $P_{root}$ by adding a single failure state and modifying its transition probability as follows.

$$\Phi(P, \{(s_i, R_i)\}_i) = (S_0 \cup \{F\}, (p'_{ij})) \quad (3)$$

where $p'_{ij} = \begin{cases} R_i \cdot p_{ij} & (s_i, s_j \in S_0) \\ 1 - R_i & (s_i \in S_0, s_j = F) \\ 0 & (\text{otherwise}) \end{cases}$ The auxiliary function $\phi$ in turn is defined inductively as $$\varphi(P, t) = \{(s_i, R_i(t)) | s_i \in S_0\} \quad (4)$$

where $$R_i(t) = \begin{cases} \sum_s \pi_{P_i}(s, t) \cdot \rho_i(s) & ((s_i, P_i, \rho_i) \in U(P_0)) \\ R(\Phi(P_i, \varphi(P_i, t))) & ((s_i, P_i) \in I(P_0)) \\ 1 & (\text{otherwise}) \end{cases}$$

It is noted that $R(\Phi(P_i, \phi(P_i, t)))$ in the second case is equal to $SR(P_i, t)$, which provides for an inductive definition of $SR(P, t)$. It is also noted that $\pi_P$ computes the transient probability of each state of the CTMC P. It is assumed that the initial state of P is fixed and thus does not appear explicitly in the definition.

$$\pi_P(s,t) = Pr[\text{CTMC } P \text{ stays in } s \text{ at } t] \quad (5)$$

Figure 2:
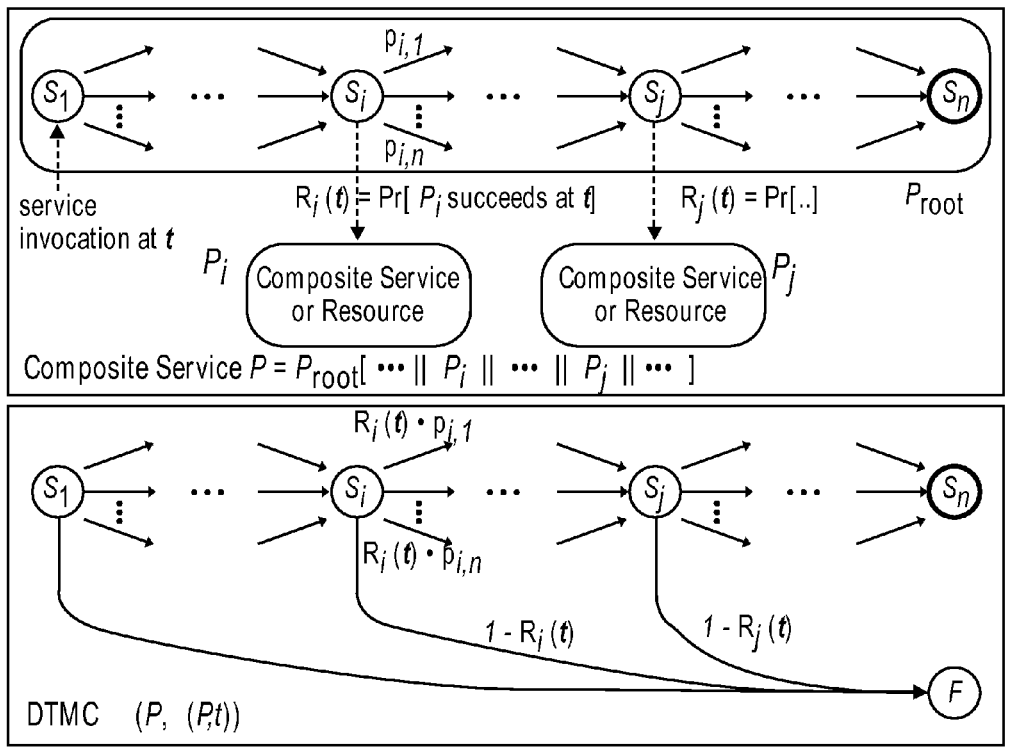
FIG. 2 is a diagram of an example discrete-time Markov chain (DTMC) for determining service reliability, according to an embodiment of the invention.

With these DTMC and CTMC definitions, along with the resource reliability being defined, the service reliability of a composite service can be determined. Suppose a service, denoted by $P_{root}$, is defined as a DTMC with n states, $s_1, s_2, \ldots, s_n$, as depicted in FIG. 2, where FIG. 2 shows an example DTMC for determining service reliability, according to an embodiment of the invention. Without sacrificing generality, it can be supposed that the service execution starts at $s_1$ and completes at $s_n$ (outdegree($s_n$)=0). For the transitions, the transition probability from $s_i$ to $s_j$ is denoted by $p_{ij} (0 \leq p_{ij} \leq 1)$. It is further assumed that $P_{root}$ invokes (or uses) at $s_i$ an external service or resource, which is denoted by $P_i$. Since the invocation, or usage, of $P_i$ may either succeed or fail, the probability that $P_i$ succeeds at time t is denoted by $R_i(t)$.

To take account of the possible failures during service execution, a single failure state, denoted by F, is added to P, which changes the transition probabilities of P as follows. The transient probability from $s_i$ to $s_j$ is changed to $R_i(t) \cdot p_{ij}$, and the probability from $s_i$ to F is set to $(1 - R_i(t))$, as can be seen in the lower part of FIG. 2. It then follows naturally to define the service reliability of composite service $P_{root}[P_1||L||P_n]$ by the service reliability of this extended DTMC.

In general, $P_i$ may be either a resource or a service. When $P_i$ is a resource, it is assumed that the $P_i$ has a resource reliability $R_i(t)$ that is provided as part of the definition of $P_i$. When $P_i$ is a service, initially just the DTMC definition of $P_i$ is provided. However, because of the recursive structure of P, the processing described above can be applied for P to determine the service reliability of $P_i$, which can then define $R_i(t)$. It is noted that $R_j(t)$ ($i \neq j$) may be correlated when $P_i$ and $p_j$ share the same resource.

The service reliability SR, defined in Equation (2), is time-dependent as a function of t. Its equilibrium value $\overline{SR}(P)$ is defined as follows.

$$\overline{SR}(P) = E[SR(P, t)] = \lim_{T \to \infty} \frac{1}{T} \int_0^T SR(P, t) dt \qquad (6)$$

Instead of calculating this directly by relying on the definition in Equation (2), a new process has been developed to compute $\overline{SR}$ efficiently. This approach is generally described, and then a specific flowchart of such a method is presented and described for the general case.

Suppose a composite service P consists of a service $P_{root}$ that uses a resource $P_1$ ($P=P_{root}[P_1]$). Supposed also that $P_{root}$ uses $P_1$ at time t when $P_{root}$ visits state $s_0$ and the resource stays in state $s_1$. Because the resource reliability $\rho$ is provided, which maps $s_1$ to $\rho(s_1) \in [0,1]$, SR(P, t), which is the service reliability of $P_{root}[P_1]$, can be determined by modifying $P_{root}$ as in FIG. 2 ($R_i(t)=\rho(s_1)$), and then applying Equation (1). In this case, SR(P, t) turns out to be $R(\Phi(P,\{(s_0,\rho(s_1))\}))$. In the long run, the resource $P_1$ will have different states according to its steady-state probabilities $\pi_{P_1}$. Thus, it follows that the following equation holds.

$$\overline{SR}(P) = \Sigma \pi_{P_1}(s_1) \cdot R(\Phi(P,\{(s_0,\rho(s_1))\})) \qquad (7)$$

Figure 3A:
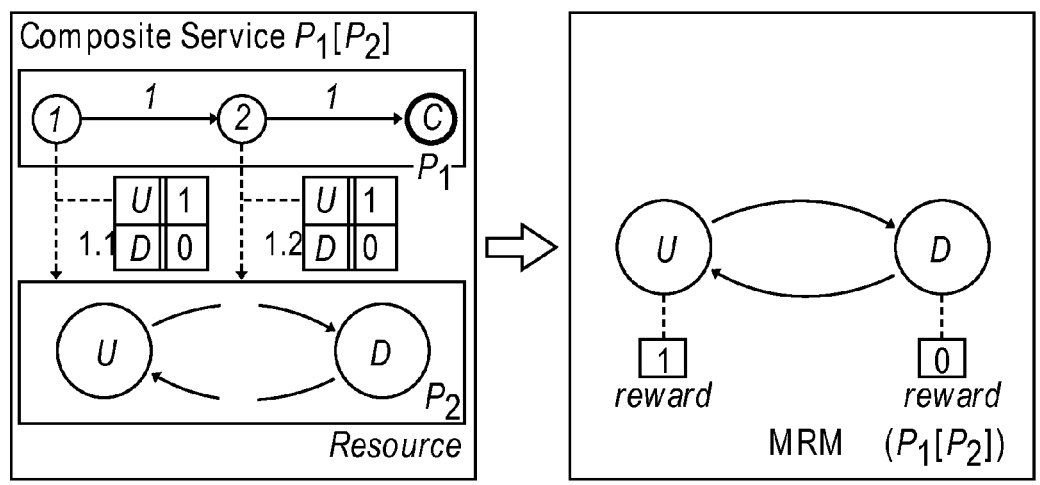
FIGS. 3A, 3B, 3C, and 3D are diagrams of example composite services, according to different embodiments of the invention.

For example, FIG. 3A shows an example composite service, according to an embodiment of the invention. Thus, $P_1$ in FIG. 3A is defined as a three-state DTMC, of which the two transitions are associated with probabilities. In turn, $P_2$ is defined as a CTMC, which makes a distinction between the U states and the D states. It is assumed that success or failure of $P_1$ depends entirely on the status of $P_2$; that is, when execution of $P_1$ reaches the state labeled 1 (or 2), the execution goes on if its use of $P_2$ in the state succeeds, and the success of the use depends solely on whether $P_2$ is up or down.

To specify this correspondence, mappings $\rho_{1,1}$ and $\rho_{1,2}$ are introduced, from the status of $P_2$ to $\{0, 1\}$. In this case, $\rho_{1,1}(U)=\rho_{1,2}(U)=1$ and $\rho_{1,1}(D)=\rho_{1,2}(D)=0$. This implies that the reliabilities of these two resource uses are perfectly correlated. As such, for each state of $P_2$ the reliability of $P_1 [P_2]$ can be determined as follows.

$$\begin{cases} R(\Phi(P, \{(1, 1), (2, 1)\})) = 1 & (s_1 = U) \\ R(\Phi(P, \{(1, 0), (2, 0)\})) = 0 & (s_1 = D) \end{cases}$$

By associating $P_2$ with these values, the MRM depicted on the right side of FIG. 3A is obtained. Finally, $\overline{SR}(P_1[P_2])$ is obtained using Equation (7), which turns out to be $$\pi_{P_1}(U) \cdot 1 + \pi_{P_1}(D) \cdot 0 = \frac{\mu}{\lambda + \mu}.$$

Figure 3B:
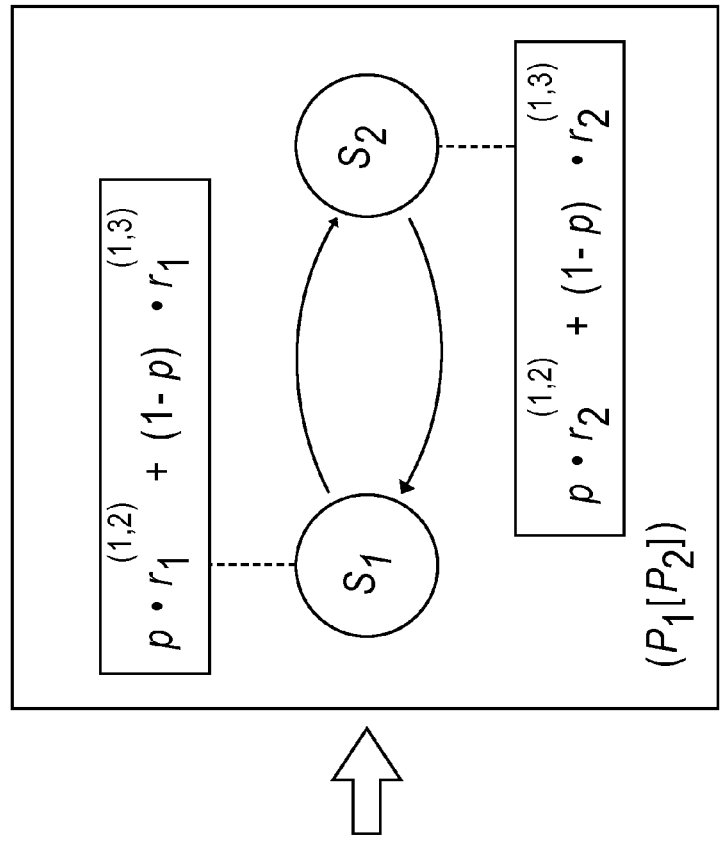
Figure 3B:
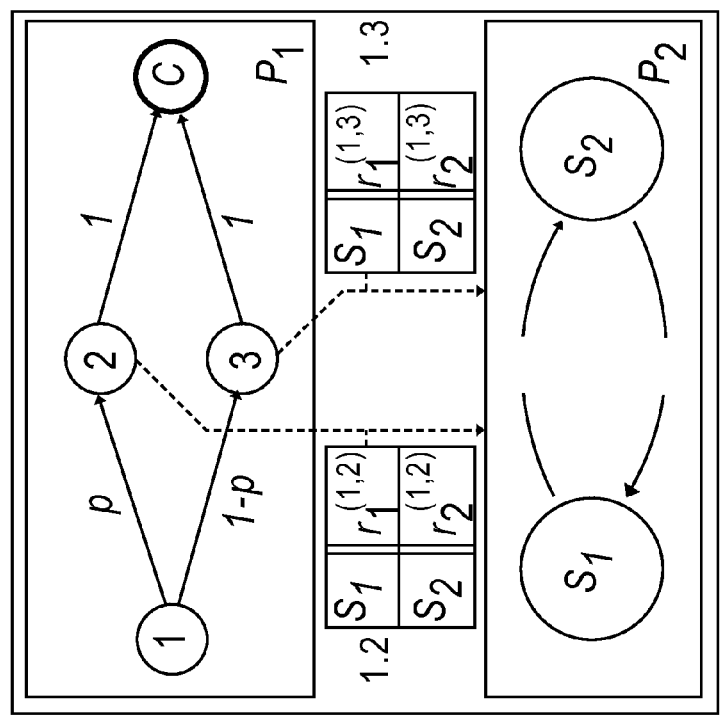

Now, before extending Equation (7) to the general form in relation to which a method of an embodiment of the invention is presented and described, three more examples are provided for further understanding. First, FIG. 3B shows another example composite service, according to an embodiment of the invention. In FIG. 3B, the composite service includes $P_1$ and $P_2$, in which $P_1$ is a probabilistic branch. From its initial state, one of the two subsequent states is chosen with the probabilities p and 1−p. Hence, $R(P_1)$ is determined for each state of $P_2$ as follows.

$$R(P_1) = \begin{cases} p \cdot \rho_{1,2}(s_1) + (1-p) \cdot \rho_{1,3}(s_1) & (P_2 \text{ is at } s_1) \\ p \cdot \rho_{1,2}(s_2) + (1-p) \cdot \rho_{1,3}(s_2) & (P_2 \text{ is at } s_2) \end{cases}$$

These two values are denoted by $\rho(s_1)$ and $\rho(s_2)$. By associating $\rho(s_1)$ and $\rho(s_2)$ to the states of $P_2$, an MRM is obtained, which is then used to determine the reliability of the composite service as $\overline{SR}(P_1[P_2])=\pi_{P_2}(s_1) \cdot \rho(s_1) \cdot \rho(s_1) + \pi_{P_2}(s_2) \cdot \rho(s_2)$.

Figure 3C:
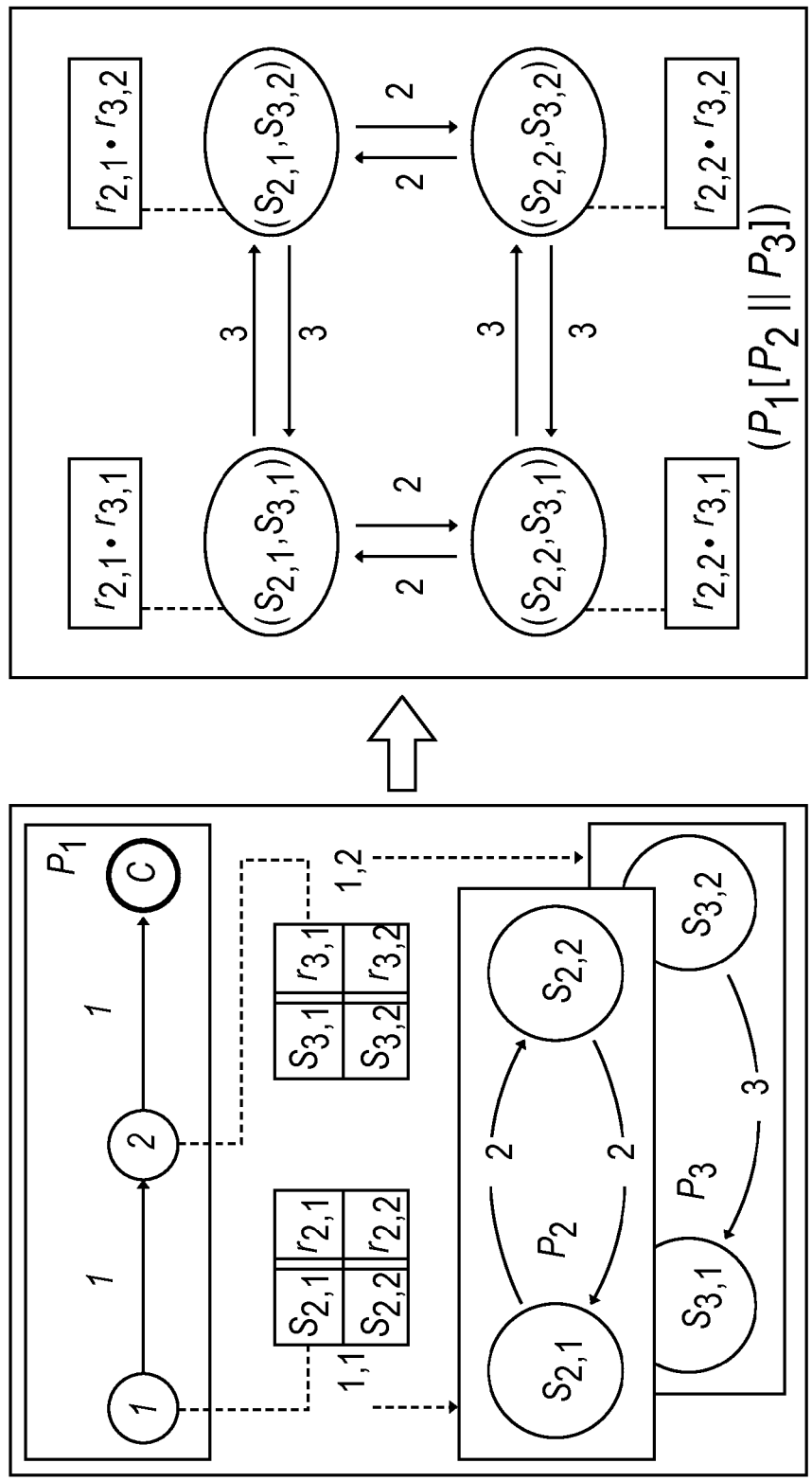

Second, FIG. 3C shows another example composite service, according to an embodiment of the invention. In this example, $P_1$ uses both $P_2$ and $P_3$ such that $P_1[P_2 \| P_3]$. It is assumed that the two resources $P_2$ and $P_3$ are independent of one another. During its execution $P_1$ uses $P_2$ and $P_3$ in its first and second states, respectively. In this case, the product of $P_2=(S_2, R_2)$ and $P_3 (S_3, R_3)$ is first built, which is a CTMC (S, R) that is defined as follows.

$$S = S_2 \times S_3 = \{(s_2, s_3) \mid s_2 \in S_2, s_3 \in S_3\}$$

$$R(s, s') = \begin{cases} R_2(s_2, s_2') & (s = (s_2, s_3), s' = (s_2', s_3)) \\ R_3(s_3, s_3') & (s = (s_2, s_3), s' = (s_2, s_3')) \end{cases}$$

Thus, this CTMC represents the stochastic behavior of the system of the two resources.

For each state of the CTMC, $R(P_1)$ can be determined according to Equation (1). For the state $(s_{2,1}, s_{3,1})$, for example, $R(P_1)$ is determined as $r_{2,1} \cdot r_{3,1}$, using $\rho_{(1,1)}(s_{2,1})=r_{2,1}$ and $\rho_{(1,2)}(s_{3,1})=r_{3,1} \cdot R(P_1)$ is denoted as $\rho(s_{2,1}, s_{3,1})$ for $(s_{2,1}, s_{3,1})$. For the other three states, $\rho(s_{2,2}, s_{3,1})$, $\rho(s_{2,1}, s_{3,2})$, and $\rho(s_{2,2}, s_{3,2})$ are calculated in the same way. Finally, by summing these values, $\overline{SR}(P_1[P_2 \| P_3])$ is determined as $\Sigma_{s_2 \in S_2, s_3 \in S_3} \pi_{(S,R)}(s_2, s_3) \cdot \rho(s_2, s_3)$.

Figure 3D:
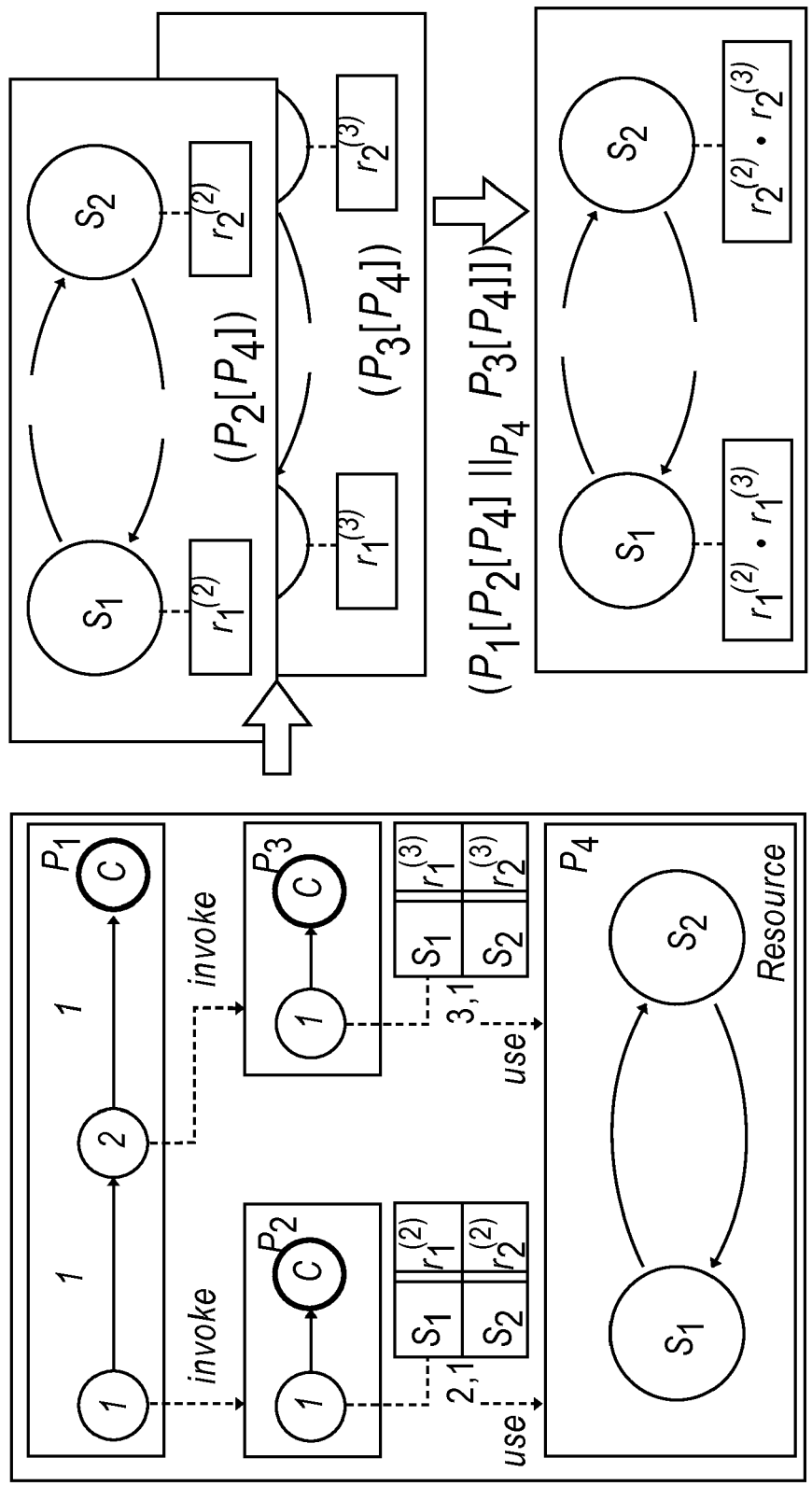

Third, FIG. 3D shows another example composite service, according to an embodiment of the invention. In this example, $P_1$ invokes $P_2$ and $P_3$, both of which use $P_4$, such that $P_1[P_2[P_4]_{P_4} P_3[P_4]]$. It is noted that $P_2$ and $P_3$ are services while $P_4$ is a resource. In this case, a CTMC is derived that corresponds to $P_2[P_4] \|_{P_4} P_3[P_4]$, in order to determine the service reliability of the composite service. In doing so, the CTMC's for $P_2[P_4]$ and $P_3[P_4]$ are first derived separately, as depicted in the upper-right part of FIG. 3D in an overlapping manner. These two CTMC's are then combined and another CTMC, for $P_1[P_2[P_4]\|_{P_4} P_3[P_4]]$, is derived, as depicted in the lower-right part of FIG. 3D. SR turns out to be $\pi_{q_1}$ in this case. It is noted that when the two CTMC's are not structurally identical, however, it is not possible to simply combine them. Such cases, as well as other cases, are now described in relation to the general case.

Figure 4A:
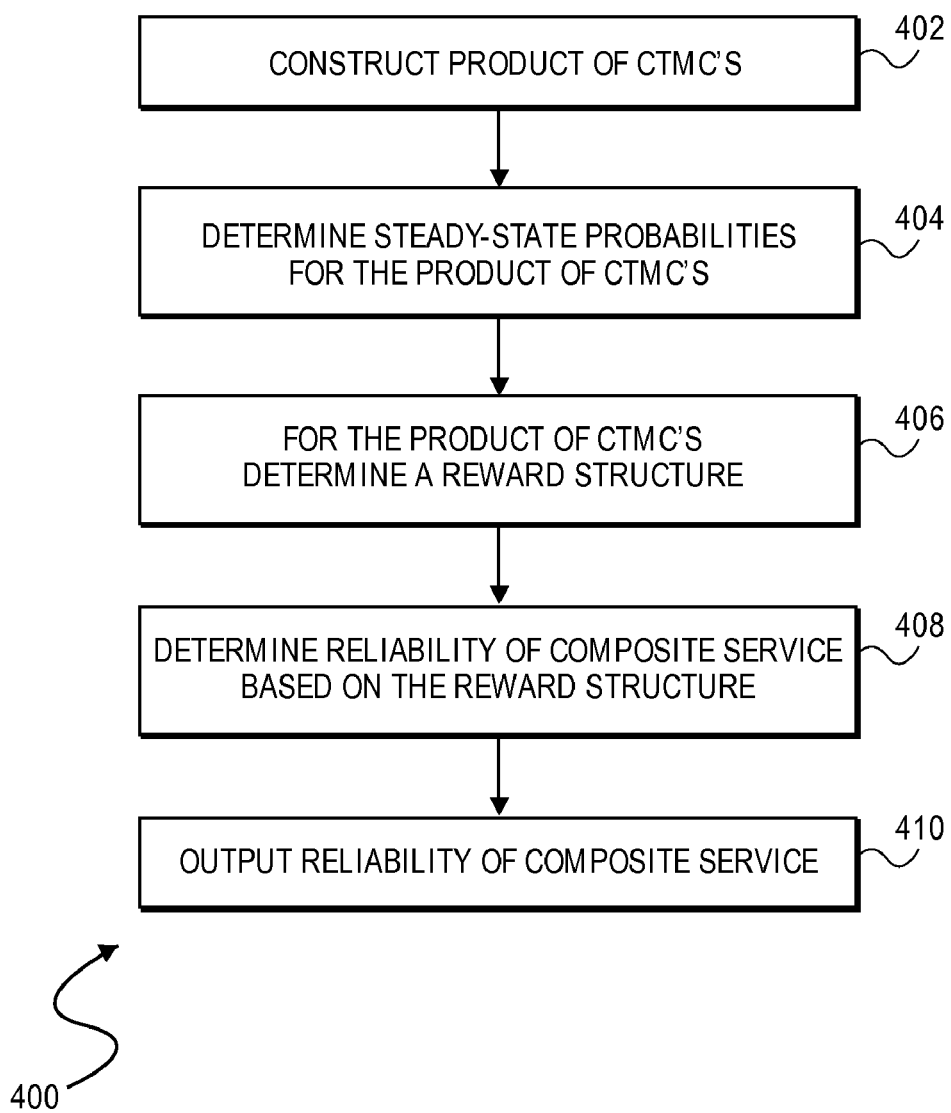
FIGS. 4A, 4B, and 4C are flowcharts of methods to determine the reliability of a composite service, according to different embodiments of the invention.

FIG. 4A shows a method 400 for determining a reliability of a composite service, according to an embodiment of the invention. The method 400 is in relation to a general case that encompasses the examples of FIGS. 3A-3D that have been described. Given a composite service P, a single flat MRM $\Psi(P)$ is derived from P. Then $\overline{SR}(P)$ is equal to the reward rate of this MRM.

$$SR(P, t) = \sum_{s \in S} \pi_{\Psi(P)}(s, t) \cdot \rho(s) \qquad (8)$$

$$\overline{SR}(P) = \sum_{s \in S} \pi_{\Psi(P)}(s) \cdot \rho(s) \qquad (9)$$

where $(S, R, \rho) = \Psi(P)$ $\pi_{\Psi(P)}(s) = \lim_{t \to \infty} \pi_{\Psi(P)}(s, t)$ Supposed P is of the form $P_0[P_1]$. $P_0$ is a DTMC and works as the root node of P, while $P_1$ consists of those services or resources invoked or used within $P_0$. $\Psi$ constructs an MRM (S, R, $\rho$) in two steps, parts, or acts. First, the CTMC part of the MRM is composed, using C, from the resources that appear in P. Then the reward structure $\rho$ is generated using R, $\Phi$, which are defined by Equation (1) and Equation (3), respectively, and an auxiliary function $\phi$ that is described later in the detailed description. That is, it is noted that the previous definition of $\phi$ defined in equation (4) is not the one used here; rather, it is redefined in equation (12) below.

$$\Psi(P)=(S,R,\rho)$$

where $(S,R)=C(P)$ $$\rho(s)=R(\Phi(P,\phi(P,s))) \quad (10)$$

Therefore, first, C(P) constructs the products of the CTMC's in $\mathcal{R}(P)$ (402), which are the resources used directly or indirectly by P. For example, FIG. 3C shows the product of two resources $P_2$ and $P_3$, which consists of four states. It is supposed that R(P) has n CTMC's, denoted by $(S_i,R_i)$ ($1 \leq i \leq n$). Then C(P) is defined as follows.

$$C(P) = (S, R) \quad (11)$$

where $$S = \prod_{1 \leq i \leq n} S_i$$

$$R(s, s') = \begin{cases} R_k(s_k, s'_k) & \begin{pmatrix} s = \begin{pmatrix} s_1, \ldots, s_{k-1}, \\ s_k, s_{k+1}, \ldots, s_n \end{pmatrix}, \\ s' = \begin{pmatrix} s_1, \ldots, s_{k-1}, \\ s'_k, s_{k+1}, \ldots, s_n \end{pmatrix} \end{pmatrix} \\ 0 & \text{(otherwise)} \end{cases}$$

Figure 4B:
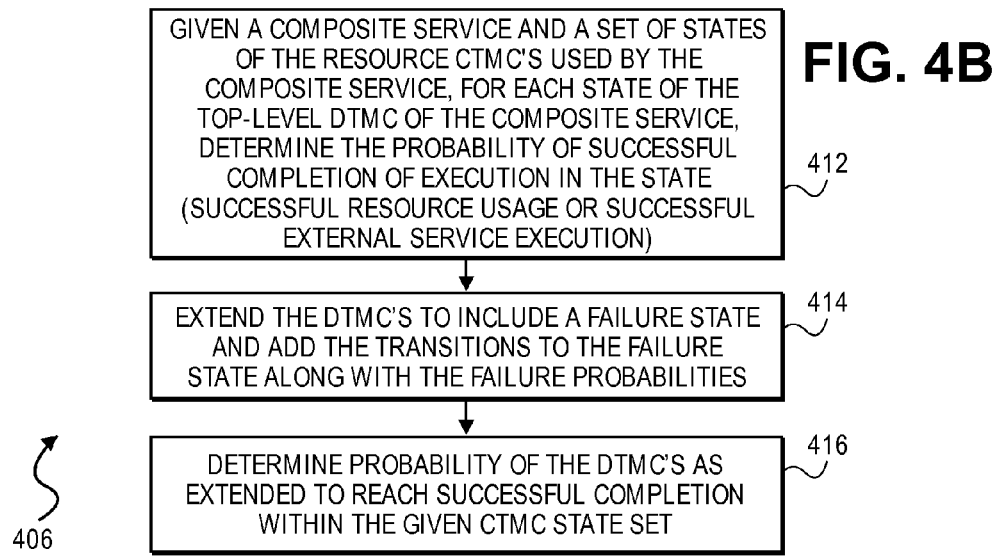

Next, steady-state probabilities are determined for the product of the CTMC's (404). For each state of a CTMC, its steady-state probability corresponds to the long-term likelihood that the CTMC states in that state. Thereafter, for the product of the CTMC's, a reward structure $\rho$ is determined (406). The reward structure $\rho$ maps each state s of the product of the CTMC's to the reliability of the composite service for the state—that is, when the state of the k-th resource is equal to the k-th element of the state of the product of the CTMC's (k=1, 2, . . . ), the reliability of the composite service is equal to the reward rate of the state $\rho$'s. FIG. 4B shows a method that can be performed to implement part 406, according to an embodiment of the invention. The method of FIG. 4B is thus performed for each state of the product of the CTMC's.

Figure 4C:
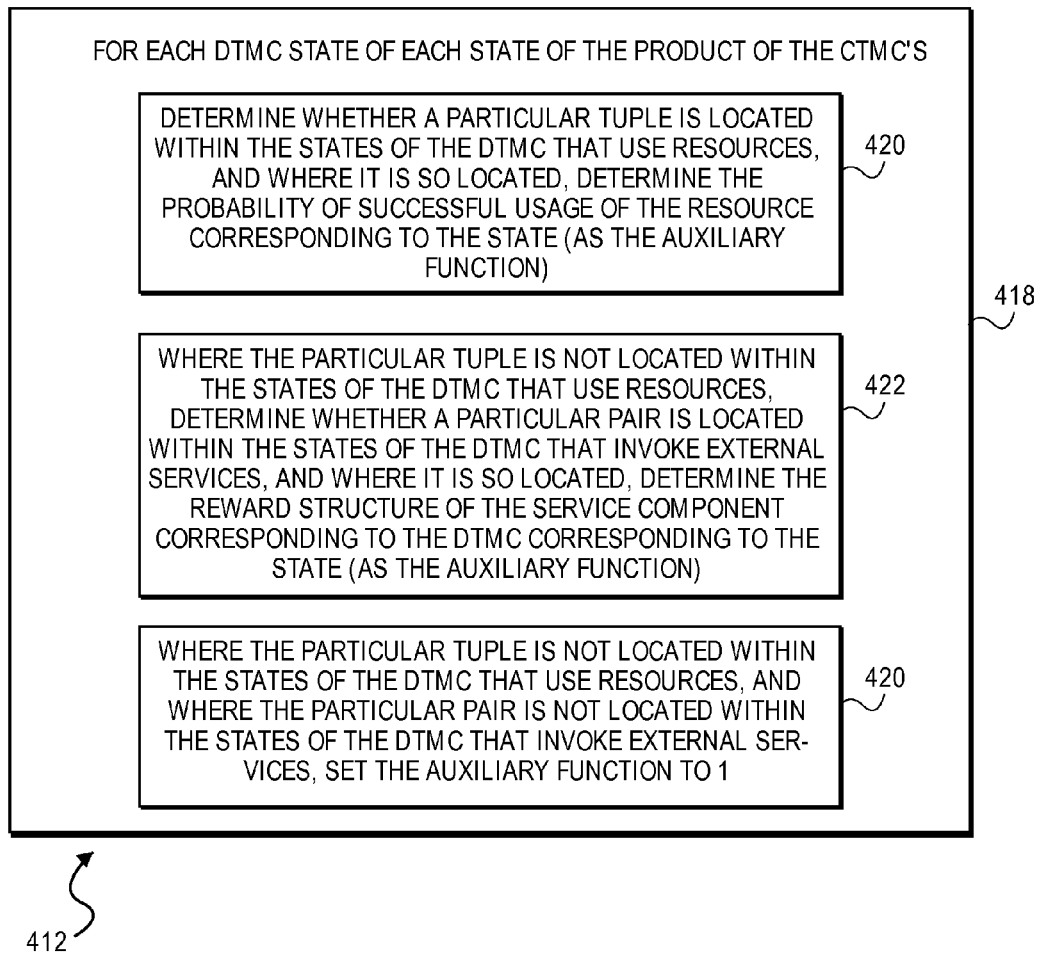

The input to the method of FIG. 4B is P, a composite service, and s, a given state of the product of the CTMC's. $P_0$ denotes the top-level service component of P, and $P_0$ is defined as a DTMC. First, the method of FIG. 4B determines, for each state of $P_0$, the probability that execution in the state completes successfully (412). FIG. 4C shows a method that can be performed to implement part 412, according to an embodiment of the invention. The method of FIG. 4C is particularly performed for each state of (i.e., encompassed by) the product of the CTMC's (418).

Therefore, for a given DTMC $P_0$, in part 420 it is determined whether a particular tuple $(s_i, P_i, \rho_i)$ is located within U(P) of the DTMC's (420), where $U(P_0)$ denotes which states of $P_0$ uses resources. In this particular tuple, $s_i$ is the state of $P_0$ in question, $P_i$ is the resource CTMC used in the state (i.e., with the same subscript i), and $p_i$ is the reliability of this resource. If this particular tuple is so located, then the state in question corresponds to resource use, and the probability of successful use of this (underlying physical) resource corresponding to the state in question is determined in part 420—by apply $\rho_i$ to $pr_{P_i(s)}$, where $pr_{P_i}$ is a projection function that extracts, from a state of the product CTMC, a particular element corresponding to the resource $P_i$ to determine the reward value. The successful usage probabilities of resources are known a priori, and are represented by $\rho_i$ for each i.

However, if the particular tuple is not located in part 420, then the state may correspond to service invocation. As such, the method of FIG. 4C performs the following in part 422. A particular pair $(S_i, P_i)$ is located within $I(P_0)$, where $I(P_0)$ is which states $P_0$ invokes external services. In this particular pair, $s_i$ denotes the state of $P_0$, and $P_i$ is the service DTMC invoked in this state (i.e., having the same subscript i). The reward value for this state, $\rho_{s_i}$, is determined by using the auxiliary function $\phi$. In particular, this is performed recursively, such that the method of FIG. 4B is reentered to determine the reward structure in part 422. As before, the reward structure corresponds to a likelihood that the service component corresponding to the DTMC (corresponding to the state) will successfully reach the given state without failure.

It is noted that if the state does not correspond to resource usage (i.e., part 420), and the state also does not correspond to external service invocation (i.e., part 422), then in part 424 the auxiliary function $\phi$ is set to one. Therefore, in essence, what occurs in part 412 of the method of FIG. 4B is that the method of FIG. 4C is performed, which recursively calls the method of FIG. 4B for each service component invocation that is located, where the recursion ends once a resource usage is located—or that a resource usage is not located AND an external service invocation is not located.

Once part 412 of the method of FIG. 4B has been performed, the DTMC's—particularly the DTMC in relation to which the method of FIG. 4B is being performed—is extended to include a failure state (414). In one embodiment, part 414 may be performed as has been described in relation to Equation (3). Thereafter, the probability of the DTMC's—again, particularly the DTMC in relation to which the method of FIG. 4B is being performed—as extended will reach successful completion within the given state is determined (416).

The method of FIG. 4C can be represented as an auxiliary function $\phi$ that is now defined. It is noted that s is a state of C(P) and $P_0 = (S_0, P_0)$ is the root service in P. Furthermore, as has been noted above, regarding a product CTMC, the projection probability $pr_{P_k}$: $\Pi_i S_i \to U_i s_i$, extracts, from a state $s=(s_1, \ldots, s_n)$, its k-th element $s_k$ when $P_k$ is the k-th resource in $\mathcal{R}(P)$.

$$\varphi(P, s) = \{(s_i, R_i(s)) \mid s_i \in S_0\} \quad (12)$$

where $$R_i(s) = \begin{cases} \rho_i(pr_{P_i}(s)) \\ \quad ((s_i, P_i, \rho_i) \in U(P_0)) \\ R(\Phi(P_i, \varphi(P_i, pr_{P_i}(s)))) \\ \quad ((s_i, P_i) \in I(P_0)) \\ 1 \\ \quad \text{(otherwise)} \end{cases}$$

As a consequence of the recursive definition of SR in Equation (8), MRM's obtained by applying $\Psi$ to composite services turn out to be composable. For example, FIG. 5A shows a representative MRM composition, according to an embodiment of the invention. In FIG. 5A, P is defined as $P_0[P_1[P_2\|P_3]]$, where $P_2$ and $P_3$ are resources. By applying $\Psi$ to $P_1[P_2\|P_3]$ (A1 in FIG. 5A), instead of P, MRM($S_1$, $R_1$, $\rho_1$) is derived. This MRM can be regarded as a single resource, and $\Psi$ applied to its composition with $P_0$ (A2 in FIG. 5A) results what is identical to $\Psi(P)$ (A3 in FIG. 5A).

Figure 5B:
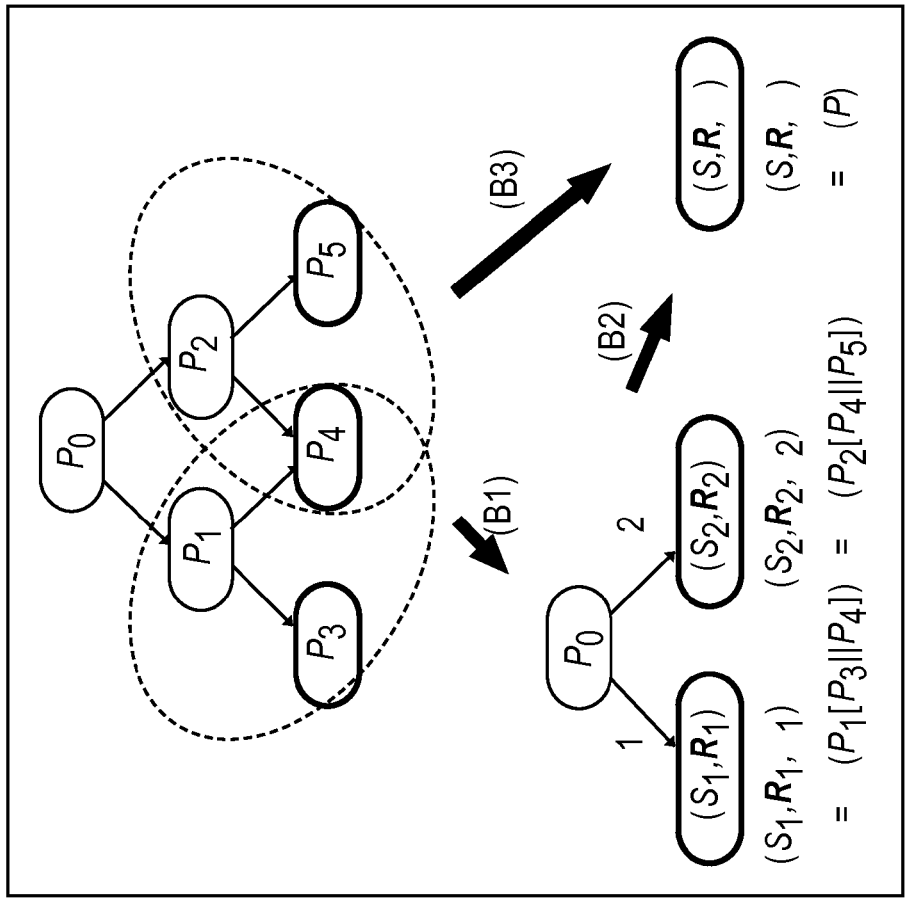
FIGS. 5A and 5B are diagrams of example Markov reward models (MRM's), according to different embodiments of the invention.
Figure 5A:
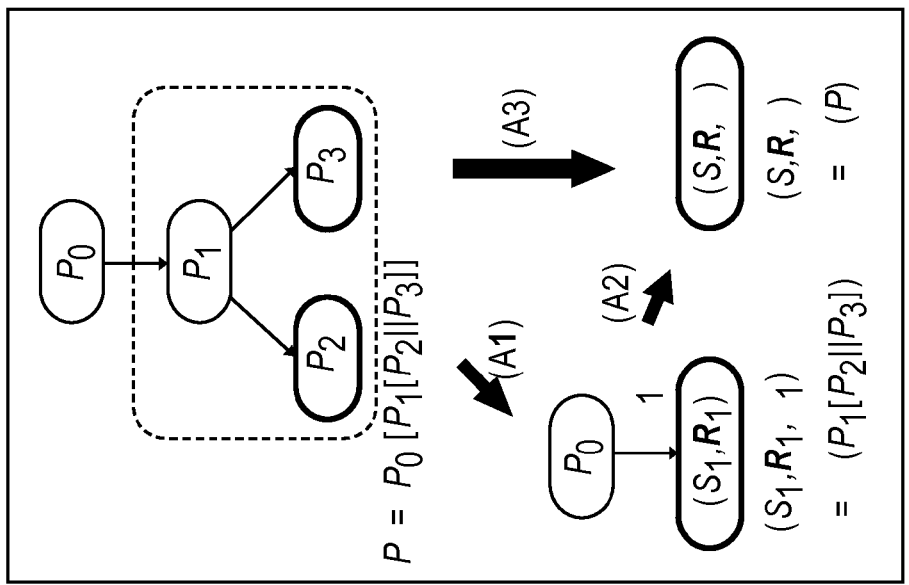

FIG. 5B shows a representative MRM composition, according to another embodiment of the invention. In FIG. 5B, what is first derived is $(S_1, R_1, \rho_1)=\Psi(P_1[P_3\|P_4])$ and $(S_2, R_2, \rho_2)=\Psi(P_2[P_4\|P_5])$. Then the composition of these two MRM's and $P_0$ becomes identical to $\Psi(P)$.

Referring back to FIG. 4A, once the reward structure has been determined for each state of the product of CTMC's in part 406, the reliability of the composite service as a whole is determined based on these reward structures (408). One advantage of using the MRM formulation that has been described is that it reduces the reliability analysis of a composite service into the analysis of its constituent services. Demonstration of this advantage, and the manner by which part 408 can be performed, is now provided by example computation of failure-related values.

The first example is a failure probability at time t, where the reliability of the composite service would be one minus this failure probability. For example, consider the composite service P of FIG. 2. When a failure occurs at t during execution of P, the failure is caused by one of its service invocations. The visit count of $s_i$ is denoted by $vc(s_i)$, which is the average number of visits to the state $s_i$ in each run of P. Therefore, the probability that P fails can be decomposed as follows.

$$Pr[P \text{ fails at } t] = \sum_i vc(s_i) \cdot Pr[P_i \text{ fails at } t] \qquad (13)$$

where $vc(s_i) = \#/$ visits to $s_i$ of $P$

It is noted that, according to Equation (4), $Pr[P_i \text{ fails at } t]=1-R_i(t)$ holds. By applying this equation repeatedly, the degree to which each component affects the entire service can be determined.

Figure 6:
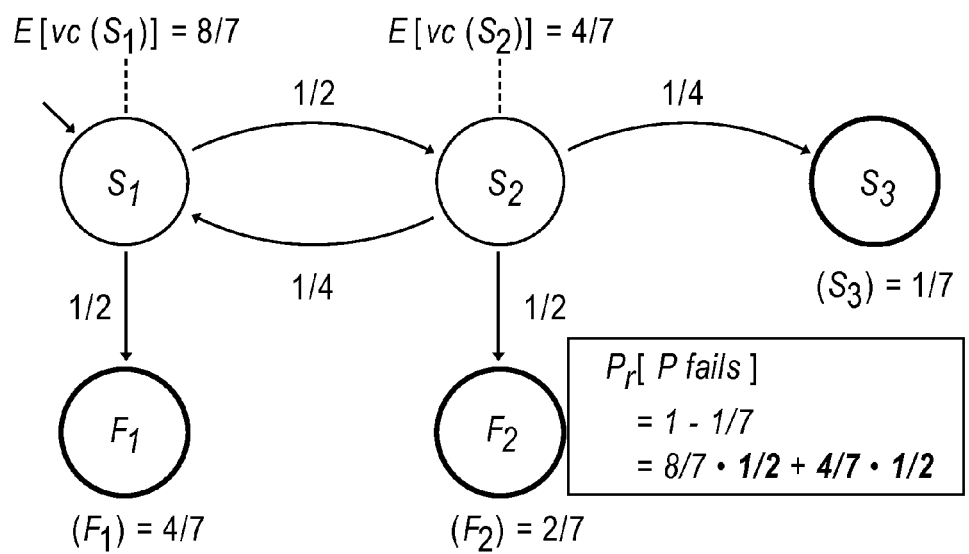
FIG. 6 is a diagram of an example three-state DTMC, according to an embodiment of the invention.

For instance, FIG. 6 shows an example three-state DTMC, according to an embodiment of the invention. At each of the first two states, execution fails at the probability 0.5. Therefore, $vc(s_1)=8/7$, $vc(s_2)=4/7$, and $Pr[P \text{ fails at } t]=vc(s_1)\cdot 0.5 + vc(s_2)\cdot 0.5=6/7$.

Figure 7A:
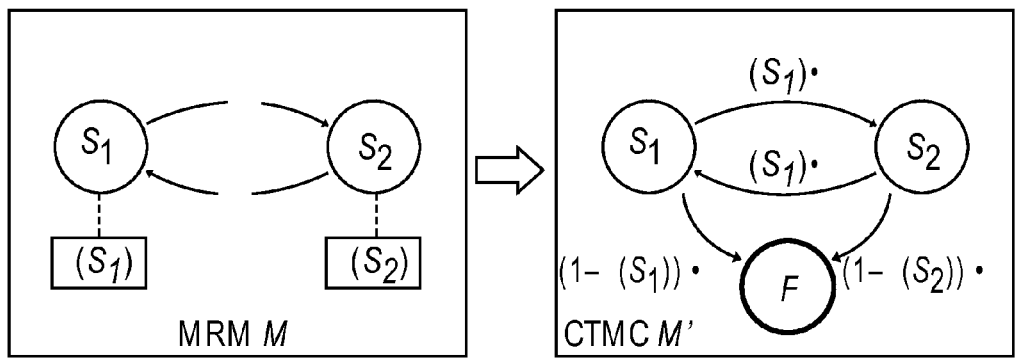
FIGS. 7A and 7B are diagrams of examples of how the mean time to absorption (MTTA) is determined, according to different embodiments of the invention.

A first case of time to failure is now described. It is assumed that composite services keep processing their incoming requests continuously, without any breaks. Under this assumption, to compute the MTTF of a service p, the following technique can be directly applied. FIG. 7A shows an example of determining the mean time to absorption (MTTA), according to an embodiment of the invention, and in relation to which this technique is described. First, the MRM M is derived from P (i.e., $M=\Psi(P)$) by adding a single failure state F, as depicted in FIG. 7A.

Now, M' denotes the modified version of M. It therefore turns out that the MTTF of P is equal to the MTTA of M'. To determine the MTTA, the states of M' are divided into two disjoint subsets. The absorbing states and the transient states are denoted as $S_A \subset S$ and $S_T$, respectively, where $S_T=S\setminus S_A$. In this example, $S_A$ and $S_T$ are defined as $\{F\}$ and $\{s_1, s_2\}$, respectively. In this technique, the expected absorption time for $S_A$—i.e., the MTTA of M'—is determined as the sum of $\{\tau(s)|s \in S_T\}$.

$$MTTA = \Sigma \tau_T(s) \cdot (\tau_T Q_{TT} + \pi_T(0)=0) \qquad (14)$$

Here, $\tau_T(s)$ denotes the expected time that M' spends in s until reaching any state in $S_A$, and it can be obtained by solving $\tau_T Q_{TT}+\pi_T(0)=0$ where $Q_{TT}$ denotes the sub-matrix of Q, which is the generator matrix of M' (for which the elements correspond only with $S_T$), and $\pi_T(0)$ denotes the sub-vector of $\pi(0)$, the initial probability vector.

Figure 7B:
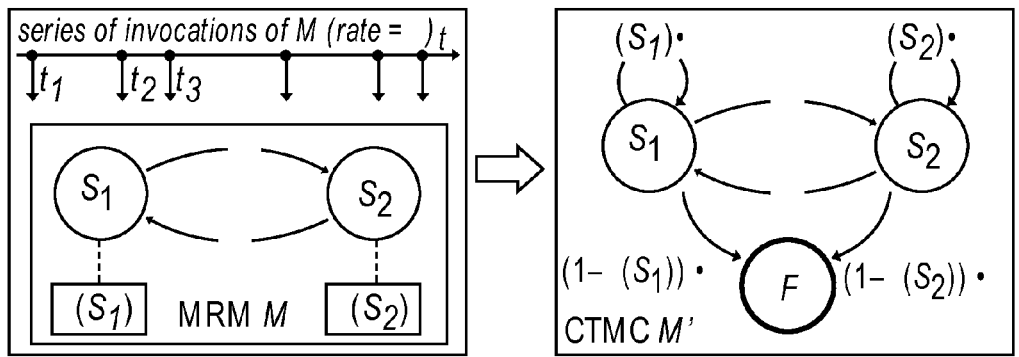

A second case of time to failure is now described. The "continuous processing" assumption noted in the first case is not likely to hold in reality. Instead, service requests are considered as arriving intermittently at a certain rate. It is supposed that a service receives and processes incoming requests at a rate of v. FIG. 7B shows an example of determining the MTTA, according to an embodiment of the invention, and in relation to which this second case is described.

In particular, the left part of FIG. 7B shows a series of invocations of a series, represented by a two-state MRM M, at $t_1, t_2, t_3, \ldots$. To compute the MTTA under the intermittent arrival assumption, M' is derived from M as follows. It is supposed that M in FIG. 7B stays in $s_1$ at t. At this point, one of two things is expected to occur: (1) a state transition to $s_2$, or (2) the arrival of a request, immediately followed by its processing. It is noted that failures are not mentioned in either of these two cases. In fact, from the service execution point of view, failures occur only during execution.

Therefore, the processing of a request noted in the previous paragraph can be divided into successful processing of an incoming request, or failure. These three possibilities can thus be incorporated into M by adding a failure state and defining transition rates as depicted in the right part of FIG. 7B. In general, M is modified to M' by adding to each state s of M a transition from s to the failure state with a rate of change $(1-\rho(s))\cdot v$, and another transition from s to itself with a rate of change $\tau(s)\cdot v$.

A third case of time to failure is now described. To determine the MTTF of a particular part of a composite service, the decomposition that was exploited for Equation (13) can be employed. Suppose a composite service P ($P=P_{root}[L\|P_i\|L]$ where $P_i$ is invoked at $s_i$ of $P_{root}$) processes incoming requests at a rate v. Since P invokes $P_i$ $vc(s_i)$ times in each run of P, the request arrival rate for $P_i$, denoted by $v_i$, becomes equal to $v\cdot vc(s_i)$. This implies that, for each invocation of P, P internally invokes $P_i$ with the probability $v\cdot vc(s_i)$. Therefore, by changing $M(=\Psi(P))$ and v to $M_i(=\Psi(P_i))$ and $v_i$, respectively, the MTTF of $P_i$ can be determined in exactly the same manner. It is noted that the above description of the MTTF of a service component is related to the conditional MTTF and the cumulative conditional MTTF.

Referring back to FIG. 4A one last time, once the reliability of the composite service has been determined in part 408, it is output (410). For example, in one embodiment, data representing the reliability may be displayed on a display device for viewing by a user. In another embodiment, data representing the reliability of the composite service may be printed on one or more media sheets (e.g., paper) by a printing device like a laser or an inkjet printing device, for viewing by the user. Other types of output of the reliability of the composite service may also be performed in part 410.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A computerized method for determining a reliability of a composite service having a plurality of service components, where the composite service is capable of failing only where underlying physical resources by which the composite service is effectuated fail, the method comprising:
   where the composite service is represented as a plurality of continuous-time Markov chains (CTMC's), each CTMC corresponding to one of the underlying physical resources, constructing, by a processor of a computing device, a product of the CTMC's, the product encompassing a plurality of states of the composite service;
   determining, by the processor, a plurality of steady-state probabilities for the product of the CTMC's, each steady-state probability corresponding to a likelihood that a corresponding state of the composite service will be a steady state of the composite service;
   for each state of the composite service, determining, by the processor, a reward structure of the state of the composite service, the reward structure corresponding to a likelihood that the state will successfully use the underlying physical resources without failure,
      wherein the reward structure is determined for a given state of the composite service based on the steady-state probability corresponding to the given state and based on a plurality of discrete-time Markov chains (DTMC's), each DTMC corresponding to one of the service components of the composite service;
   determining, by the processor, the reliability of the composite service based on the reward structure of each state of the composite service; and,
   outputting, by the processor, the reliability of the composite service as determined.

2. The method of claim 1, wherein determining the reward structure of a given state of the composite service comprises:
   determining a probability of successful completion of the service components within the given state, based on the DTMC's;
   extending the DTMC's to include a failure state, based on the probability determined; and,
   determining a probability of the DTMC's as extended to reach successful completion within the given state.

3. The method of claim 2, wherein determining the probability of successful completion of the service components within the given state, based on the DTMC's, comprises:
   for each state of the composite service encompassed by the product of the CTMC's,
      determining whether a particular tuple is located within the states of the DTMC's that use resources, the particular tuple including the state, the DTMC corresponding to the state, and a reliability of the underlying physical resource corresponding to the state;
      where the particular tuple is located within the states of the DTMC's that invoke external resources, determining a probability of successful usage of the underlying physical resource corresponding to the state;
      where the particular tuple is not located within the states of the DTMC's that invoke external resources,
         locating a particular pair within a the DTMC's, the particular pair including the state and the DTMC corresponding to the state; and,
         determining a reward structure of the service component corresponding to the DTMC corresponding to the state, the reward structure corresponding to a likelihood that the service component corresponding to the DTMC corresponding to the state will successfully reach the given state without failure.

4. The method of claim 1, wherein determining the reliability of the composite service based on the reward structure of each state of the composite service comprises determining a reliability of the composite service at a time t as $SR(P,t)=R(\Phi(P,\phi(P,t)))$, where SR is a reliability function, P is the composite service, R is a probability function as to a likelihood of a completion state being reached, $\Phi$ is a function that transform one DTMC of the composite service to another DTMC of the composite service, $\phi$ is an auxiliary function.

5. The method of claim 1, wherein outputting the reliability of the composite service as determined comprises one or more of:
   displaying data representing the reliability of the composite service on a display device for viewing by a user; and,
   printing data representing the reliability of the composite service on one or more media sheets by a printing device, for viewing by the user.

6. The method of claim 1, wherein each CTMC is defined as a pair (S, R), where S is a finite set of states and $R: S \times S \to \mathbb{R}_{\geq 0}$ is a rate matrix.

7. The method of claim 1, wherein each DTMC is defined as a pair (S, P), where S is a finite set of states and $P: S \times S \to [0,1]$ is a transition probability matrix.

8. A non-transitory computer-readable medium of a data storage device having one or more computer programs stored thereon to perform a method for determining a reliability of a composite service having a plurality of service components, where the composite service is capable of failing only where underlying physical resources by which the composite service is effectuated fail, the method comprising:
   where the composite service is represented as a plurality of continuous-time Markov chains (CTMC's), each CTMC corresponding to one of the underlying physical resources, constructing a product of the CTMC's, the product encompassing a plurality of states of the composite service;
   determining a plurality of steady-state probabilities for the product of the CTMC's, each steady-state probability corresponding to a likelihood that a corresponding state of the composite service will be a steady state of the composite service;
   for each state of the composite service, determining a reward structure of the state of the composite service, the reward structure corresponding to a likelihood that the state will successfully use the underlying physical resources without failure,
      wherein the reward structure is determined for a given state of the composite service based on the steady-state probability corresponding to the given state and based on a plurality of discrete-time Markov chains (DTMC's), each DTMC corresponding to one of the service components of the composite service;
   determining the reliability of the composite service based on the reward structure of each state of the composite service; and,
   outputting the reliability of the composite service as determined.

9. The non-transitory computer-readable medium of claim 8, wherein determining the reward structure of a given state of the composite service comprises:
   determining a probability of successful completion of the service components within the given state, based on the DTMC's;
   extending the DTMC's to include a failure state, based on the probability determined; and,
   determining a probability of the DTMC's as extended to reach successful completion within the given state.

10. The non-transitory computer-readable medium of claim 9, wherein determining the probability of successful completion of the service components within the given state, based on the DTMC's, comprises:

for each state of the composite service encompassed by the product of the CTMC's,
   determining whether a particular tuple is located within the states of the DTMC's that use resources, the particular tuple including the state, the DTMC corresponding to the state, and a reliability of the underlying physical resource corresponding to the state;
   where the particular tuple is located within the states of the DTMC's that use resources, determining a probability of successful usage of the underlying physical resource corresponding to the state;
   where the particular tuple is not located within the states of the DTMC's, locating a particular pair within the states of the DTMC's that invoke external services, the particular pair including the state and the DTMC corresponding to the state; and,
   determining a reward structure of the service component corresponding to the DTMC corresponding to the state, the reward structure corresponding to a likelihood that the service component corresponding to the DTMC corresponding to the state will successfully reach the given state without failure.

11. The non-transitory computer-readable medium of claim 8, wherein determining the reliability of the composite service based on the reward structure of each state of the composite service comprises determining a reliability of the composite service at a time t as $SR(P,t)=R(\Phi(P, \phi(P,t)))$, where SR is a reliability function, P is the composite service, R is a probability function as to a likelihood of a completion state being reached, $\Phi$ is a function that transform one DTMC of the composite service to another DTMC of the composite service, $\phi$ is an auxiliary function.

12. The non-transitory computer-readable medium of claim 8, wherein outputting the reliability of the composite service as determined comprises one or more of:
   displaying data representing the reliability of the composite service on a display device for viewing by a user; and,
   printing data representing the reliability of the composite service on one or more media sheets by a printing device, for viewing by the user.

13. The non-transitory computer-readable medium of claim 8, wherein each CTMC is defined as a pair (S, R), where S is a finite set of states and R: $S \times S \to \mathbb{R}_{\geq 0}$ is a rate matrix.

14. The non-transitory computer-readable medium of claim 8, wherein each DTMC is defined as a pair (S, P), where S is a finite set of states and P: $S \times S \to [0,1]$ is a transition probability matrix.

* * * * *